United States Patent
Buchner

(10) Patent No.: US 8,210,212 B2
(45) Date of Patent: Jul. 3, 2012

(54) THERMAL INSULATION OF FLEXIBLE PIPES

(75) Inventor: Stefan Buchner, Hamburg (DE)

(73) Assignee: Wellstream International Limited, Newcastle-Upon-Tyne (GB)

( * ) Notice: Subject to any disclaimer, the term of this patent is extended or adjusted under 35 U.S.C. 154(b) by 843 days.

(21) Appl. No.: 12/253,846

(22) Filed: Oct. 17, 2008

(65) Prior Publication Data
US 2009/0101225 A1    Apr. 23, 2009

(30) Foreign Application Priority Data
Oct. 23, 2007 (GB) .................................. 0720713.7

(51) Int. Cl.
F16L 11/00    (2006.01)
(52) U.S. Cl. ......... 138/134; 138/137; 138/140; 138/172
(58) Field of Classification Search .................. 138/134, 138/135, 140, 172
See application file for complete search history.

(56) References Cited

U.S. PATENT DOCUMENTS

| | | | |
|---|---|---|---|
| 2,879,803 A | 3/1959 | Francois | |
| 6,363,974 B1 * | 4/2002 | Perez et al. | 138/130 |
| 6,446,672 B1 * | 9/2002 | Kalman et al. | 138/127 |
| 6,668,866 B2 * | 12/2003 | Glejbol et al. | 138/134 |
| 7,069,955 B2 * | 7/2006 | Glejbol et al. | 138/135 |
| 2001/0003992 A1 * | 6/2001 | Espinasse | 138/135 |
| 2002/0185188 A1 * | 12/2002 | Quigley et al. | 138/137 |
| 2003/0155029 A1 * | 8/2003 | Glejbol et al. | 138/134 |
| 2004/0066035 A1 | 4/2004 | Buon et al. | |
| 2006/0048833 A1 * | 3/2006 | Glejbol et al. | 138/134 |

FOREIGN PATENT DOCUMENTS

| | | |
|---|---|---|
| CN | 1163658 A | 10/1997 |
| CN | 1325420 A | 12/2001 |
| EP | 1153966 A1 | 11/2001 |
| EP | 1867906 A1 | 12/2007 |
| WO | WO96/07846 | 3/1996 |
| WO | WO01/35013 A1 | 5/2001 |
| WO | WO01/61232 A1 | 8/2001 |

OTHER PUBLICATIONS

European Patent Office, "Communication—partial European Search Report" for European Application No. EP08167009.3-2424, Oct. 7, 2009, 8 pages.
European Patent Office, "Communication—extended European Search Report" for European Application No. EP08167009.3-2424, Nov. 19, 2009, 15 pages.
Office Action from the State Intellectual Property Office of the People's Republic of China, for Chinese Patent Application No. 2008101799533, dated Jul. 19, 2011, 9 pages.

* cited by examiner

Primary Examiner — Patrick F Brinson
(74) Attorney, Agent, or Firm — Klarquist Sparkman, LLP

(57) ABSTRACT

Flexible pipe body, a method of manufacturing flexible pipe body and a method of providing a flexible pipe are disclosed. The flexible pipe body includes a fluid retaining layer, at least one tensile armor layer, at least one extruded thermal insulation layer over an outermost one of the at least one tensile armor layers and an outer shield layer over the insulation layer.

23 Claims, 5 Drawing Sheets

THERMAL INSULATION OF FLEXIBLE PIPES

CROSS REFERENCE TO RELATED APPLICATION

The present application claims priority to Great Britain Application No. GB0720713.7, filed Oct. 23, 2007, which is incorporated herein by reference.

FIELD

The present invention relates to flexible pipe body which can be used to form flexible pipe of the type suitable for transportation of mineral oil, crude oil or similar production fluids. In particular, but not exclusively, the present invention relates to flexible pipe body having a thermal insulation layer extruded over an outermost armor layer of the flexible pipe body.

BACKGROUND

Traditionally flexible pipe is utilized to transport production fluids, such as oil and/or gas and/or water, from one location to another. Flexible pipe is particularly useful in connecting a sub-sea location to a sea level location. Flexible pipe is generally formed as an assembly of a pipe body and one or more end fittings. The pipe body is typically formed as a composite of layered materials that form a fluid and pressure-containing conduit. The pipe structure allows large deflections without causing bending stresses that impair the pipe's functionality over its lifetime. The pipe body is generally built up as a composite structure including metallic and polymer layers.

In many known flexible pipe designs the pipe includes one or more tensile armor layers. The primary load on such a layer is tension. In high pressure applications, such as in deep water and ultra deep water environments, the tensile armor layer experiences high tension loads from the internal pressure end cap load as well as weight. This can cause failure in the flexible pipe since such conditions are experienced over prolonged periods of time. For this reason, it is helpful if corrosion of the armor layers is prevented as such corrosion could otherwise lessen working life of the pipe.

Unbonded flexible pipe has been an enabler for deep water (less than 3,300 feet (1,005.84 meters)) and ultra deep water (greater than 3,300 feet) developments for over 15 years. The technology enabled the industry to initially produce in deep water in the early 90's and then to ultra deep waters up to around 6,500 feet (1,981.2 meters) in the late 90's. Water depths greater than 6,500 feet push the envelope where typical free-hanging riser configurations and flexible pipe in general can operate.

It is the increasing demand for oil which is causing exploration to occur at greater and greater depths where environmental factors are more extreme. In such deep and ultra-deep water environments ocean floor temperature increases the risk of production fluids cooling to a temperature which may lead to pipe blockage. For example, when transporting crude oil blockage of the internal bore of the flexible pipe can occur due to paraffin formation. As a method to overcome such problems it has, in the past, been suggested that a layer of thermal insulation should be provided around the barrier layer of a flexible pipe, the barrier layer being the layer forming the inner bore along which fluid is transported. The thermal insulation has been somewhat effective in insulating the inner bore of the pipe from external low temperature thus helping prevent blockage. Nevertheless, the insulation effects provided have been limited.

A further problem with known insulating techniques is that such insulating layers have typically been applied in the form of helically wound tapes fabricated from so-called syntactic foams. These syntactic foams often consist of a polypropylene matrix with embedded non-polymeric (e.g., glass) micro-spheres. A disadvantage with such technologies is that they involve two manufacturing processes for the insulation layer; first a stage to extrude a suitable tape and secondly the winding of the tape onto the flexible pipe body.

A still further disadvantage with known technologies using taped insulation is that the dew point of water in an annulus region between an outer shield layer and inner barrier layer is located at the inside of the outer shield layer where the temperature is relatively low. This is a problem because water vapor originating from water permeation through the inner barrier layer can freely migrate to the outer shield through the taped layer to form liquid where the temperature is lower. The thus formed liquid can then potentially cause corrosion to steel or other metal wires forming armor layers.

A still further disadvantage with known insulating technologies is that in the case of damage to the outer shield, for example during installation of flexible pipe in the field, the annulus of the flexible pipe between the shield layer and barrier layer may flood with seawater. This increases the risk of corrosion of the steel/metal armor wires which can lead to early failure of the flexible pipe.

It is an aim of embodiments of the present technology to at least partly mitigate the above-mentioned problems.

It is an aim of embodiments of the present technology to provide flexible pipe body which can be used in flexible pipe of a type able to transport production fluids and which includes a thermal insulation layer between an inner fluid retaining layer such as a barrier layer or liner and outer shield layer of the flexible pipe.

It is an aim of embodiments of the present technology to provide flexible pipe body which reduces the risk of corrosion of armor layers due to permeation of water through the inner fluid retaining layer and/or in the case of damage to an outer shield layer.

It is an aim of embodiments of the present technology to provide a riser assembly and method of manufacturing a flexible pipe able to operate in deep and ultra-deep water environments.

According to a first aspect of the present technology there is provided flexible pipe body for a flexible pipe, said pipe body comprising:

a fluid retaining layer:

at least one tensile armor layer;

at least one extruded thermal insulation layer over an outermost one of said at least one tensile armor layer; and an outer shield layer over the insulation layer.

According to a second aspect of the present technology there is provided a method of manufacturing flexible pipe body, the method comprising:

providing a tubular fluid retaining layer;

forming at least one tensile armor layer over the fluid retaining layer:

extruding a thermally insulating layer over an outermost one of said at least one tensile armor layer; and forming an outer shield layer over the insulating layer.

According to a third aspect of the present technology there is provided a method of providing a flexible pipe, the method comprising:

securing a respective end fitting to each of two free ends of a portion of flexible pipe body; and during the securing step, sealing a respective end fitting to an extruded thermally insulating layer formed in the flexible pipe body between an outermost tensile armor layer and an outer shield layer thereby providing a liquid water barrier from end fitting to end fitting along the length of the flexible pipe.

According to a fourth aspect of the present technology, a method comprises:

providing a flexible pipe body comprising a fluid retaining layer, at least one tensile armor layer, at least one extruded thermal insulation layer over an outermost one of said at least one tensile armor layer, and an outer shield layer over the insulation layer; and transporting fluid through the pipe body.

Embodiments of the present technology provide flexible pipe body in which a thermal insulation layer is extruded over an outside of an outer tensile armor layer. This forms a continuous layer along the flexible pipe body between end fittings of the flexible pipe. This insulation layer is thus sealed from end to end of the flexible pipe. On the outside of the insulation layer the outer shield layer is extruded and this provides a number of advantages. Firstly, thermal insulation is provided to reduce or eliminate blockage of the inner pipe bore by, for example, ensuring that the temperature within the barrier layer does not drop below the paraffin cloud point if crude oil is being transported. A second advantage is the prevention of convection of water vapor from transport fluid through the barrier layer or liner across the annulus to the inside surface of the outer shield where the water vapor will make the transition to liquid water due to cooler temperatures. Such water liquid might otherwise permeate back towards the bore of the pipe and potentially corrode any armor layers. Thirdly, the extruded insulation layer provides an additional barrier against liquid water ingress to a region where metallic wires may be found should an outer shield layer be accidentally breached. The need to 'pig' the pipeline may thus be delayed or eliminated.

The flexible pipe body can be used, for example, for the extraction, transport or refining of mineral oil or related fluids, or the transport of cold fluids, such as e.g., liquid ammonia.

The foregoing and other features and advantages of the present technology will become more apparent from the following detailed description, which proceeds with reference to the accompanying figures.

BRIEF DESCRIPTION OF THE DRAWINGS

Embodiments of the present technology will now be described hereinafter, by way of example only, with reference to the accompanying drawings in which.

In the drawings like reference numerals refer to like parts.

DETAILED DESCRIPTION

Figure 1:
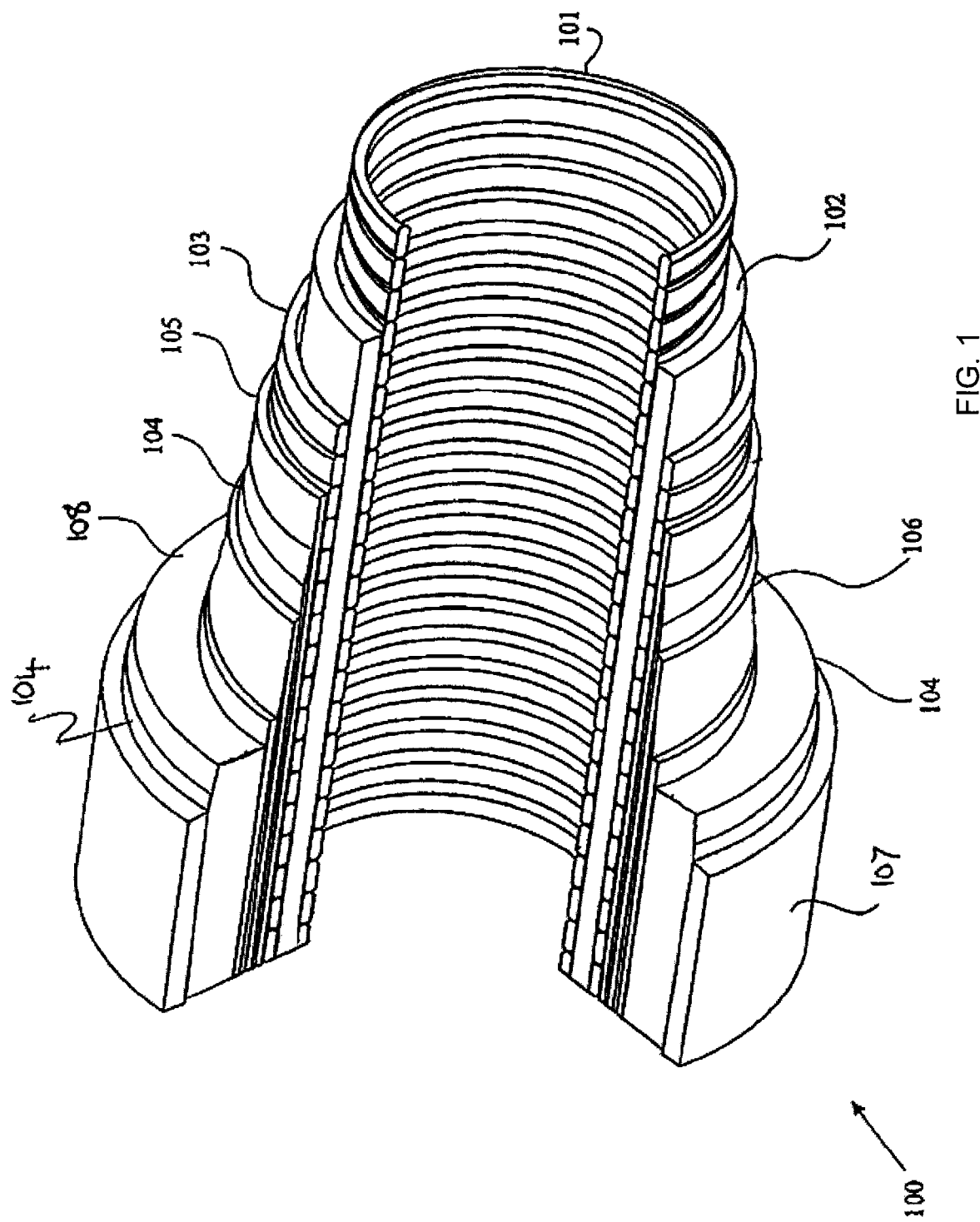
FIG. 1 illustrates a flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 100 is formed in accordance with an embodiment of the present technology from a composite of layered materials that form a pressure-containing conduit. Although a number of particular layers are illustrated in FIG. 1, it is to be understood that the present technology is broadly applicable to composite pipe body structures including two or more layers.

As illustrated in FIG. 1, a pipe body typically includes an innermost carcass layer 101. The carcass provides an interlocked metallic construction that can be used as the innermost layer to prevent, totally or partially, collapse of an internal pressure sheath 102 due to pipe decompression, external pressure, tensile armor pressure and mechanical crushing loads. It will be appreciated that embodiments of the present technology are applicable to 'smooth bore' as well as such 'rough bore' pipe body.

The internal pressure sheath 102 acts as a fluid retaining layer and typically comprises a polymer layer that ensures internal-fluid integrity. It is to be understood that this barrier layer may itself comprise a number of sub-layers. It will be appreciated that when the optional carcass layer is utilized the fluid retaining layer is often referred to as a barrier layer. In operation without such a carcass (so-called smooth bore operation) the retaining layer may be referred to as a liner.

A pressure armor layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 104 and a first tensile armor layer 105 and second tensile armor layer 106. Each tensile armor layer is a structural layer with a lay angle typically between 20° and 55°. Each layer is used to sustain tensile loads and internal pressure. The tensile armor layers are typically counter-wound in pairs.

The flexible pipe body also typically includes an outer sheath 107 which comprises a polymer layer used to protect the pipe against ingress of seawater and other external environments, corrosion, abrasion and mechanical damage.

Each flexible pipe comprises at least one portion, sometimes referred to as a segment or section of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
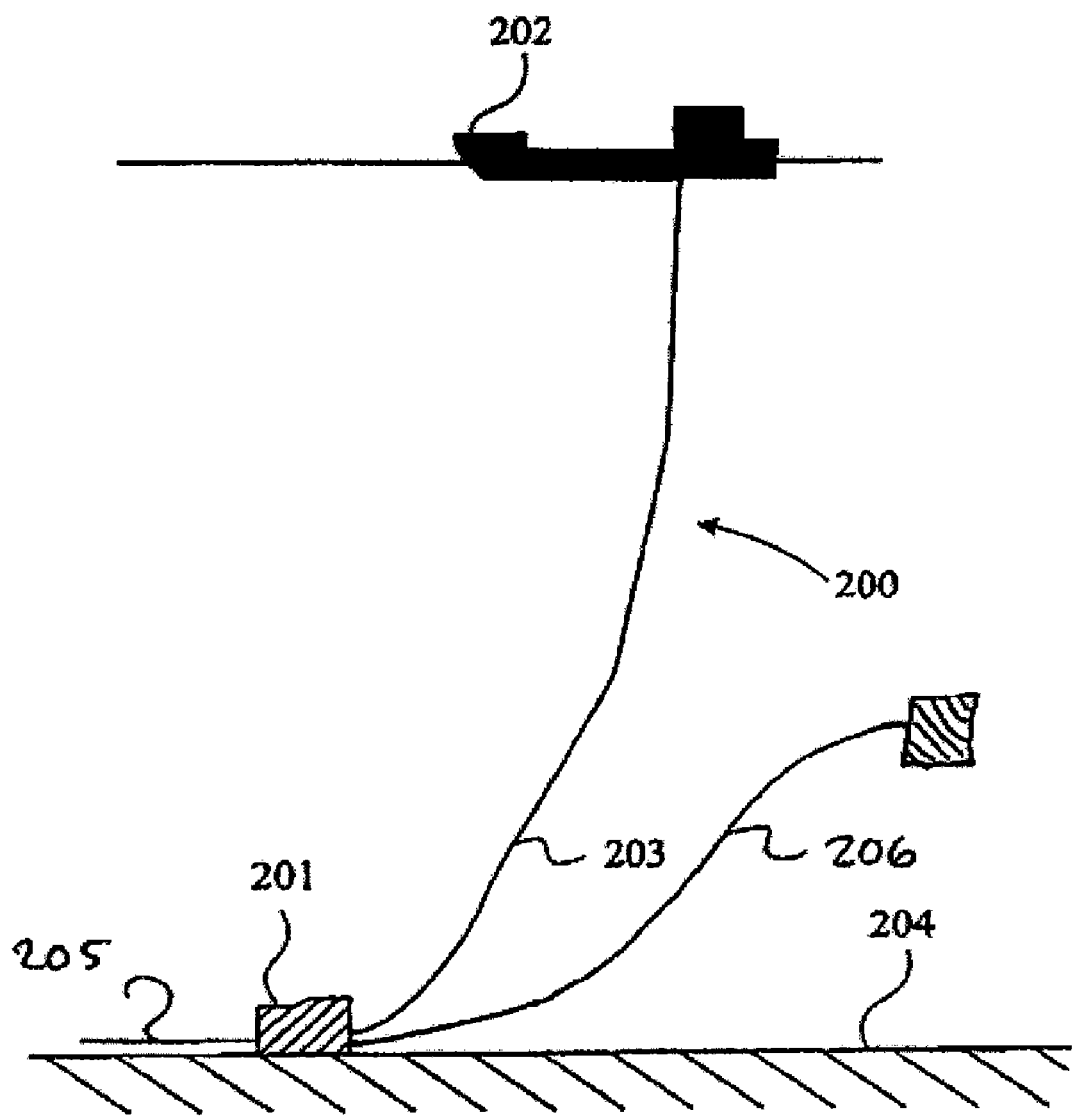
FIG. 2 illustrates a catenary riser.

FIG. 2 illustrates a riser assembly 200 suitable for transporting production fluid such as oil and/or gas and/or water from a sub-sea location 201 to a floating facility 202. For example, in FIG. 2 the sub-sea location 201 is a sub-sea flow line. The flexible flow line 203 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation.

FIG. 2 also illustrates how portions of flexible pipe body can be utilized as a flowline 205 or jumper 206.

It will be appreciated that there are different types of riser, as is well-known by those skilled in the art. Embodiments of the present technology may be used with any type of riser, such as a freely suspended (free, catenary riser), a riser restrained to some extent (buoys, chains), totally restrained riser or enclosed in a tube (I or J tubes).

As illustrated in FIG. 1 a thermal insulation layer 108 is extruded onto the outside of the outer tensile armor layer 106. The thermal insulation layer 108 forms a continuous layer between end fittings located at either end of a section of flexible pipe body. It will be understood that the thicknesses of layers shown in FIG. 1 are not to scale and that in fact the insulation layer 108 may be relatively thicker or thinner than shown. The function of the continuous and sealed insulation layer is threefold. Aptly the layer provides thermal insulation. Aptly the thermal insulation layer 108 prevents convection of water vapor from the annulus to the inside surface of the outer shield. Also aptly the insulating layer provides an additional barrier against liquid water ingress into the annulus from the outside of the insulation layer. Although not illustrated in FIG. 1 it will be appreciated that further layers of the flexible pipe body may be formed between the thermal insulation layer 108 and outer sheath 107.

It is to be noted that by extruding the insulation layer directly onto the outside of the outer tensile re-enforcement layer (or as illustrated in FIG. 1 over a tape layer formed over the outer tensile armor layer 106), the number of manufacturing steps is reduced when compared to conventional flexible pipe body. There is a resultant cost reduction.

Also by extruding the insulation layer 108 directly onto the outside of the outer tensile re-enforcement layer and sealing it in end fitting convection of water vapor outwardly from an inner zone of the pipe to the inside of the shield layer is prevented. This increases the dew point temperature of water in the annulus region containing the steel re-enforcement wires between the outside of the internal pressure sheath and the inside of the extruded insulation layer. This thus prevents or reduces water condensation in the annulus and consequential degradation of the steel wires.

Also by extruding the insulation directly onto the outside of the outer tensile re-enforcement layer and sealing it in an end fitting, water condensed between the insulation layer 108 and the outer shield 107 cannot flow into the annulus and generate a corrosive environment for the steel wires.

Still furthermore by extruding the insulation layer 108 directly onto the outside of the outer tensile re-enforcement layer and sealing it in the end fitting, flooding of the annulus of the flexible pipe will be avoided in the case of damage to the outer shield 107. Effectively the insulation layer thus serves as an additional liquid water shield.

For deep water applications where good compression strength and compressive creep behavior is desirable/required to resist the hydrostatic external pressure of the pipe the insulating layer may include high pressure resistance elements such as glass micro-spheres. This is detailed hereinafter in more detail.

In applications with moderate water depth, where lower external pressure conditions exist, it will be appreciated that the extruded insulation layer would not require such pressure resisting elements and other forms of extruded material may be used. Again this is described herein below in more detail.

Figure 3:
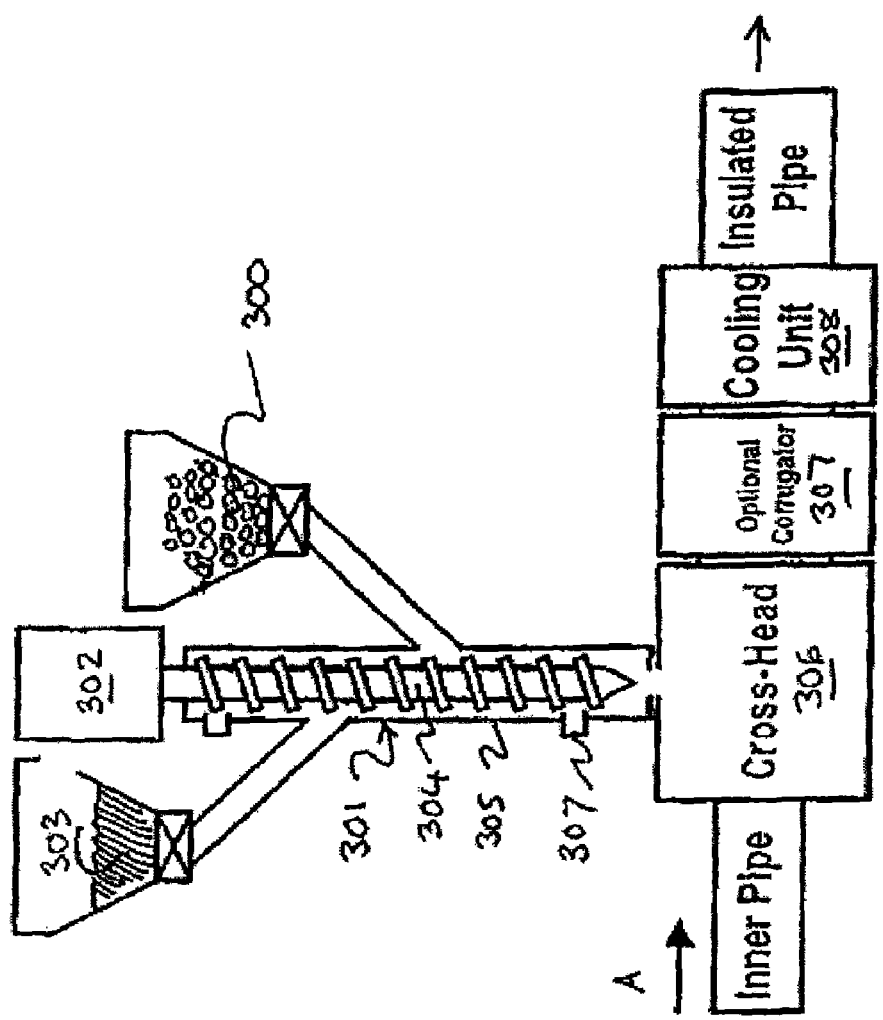
FIG. 3 illustrates a manufacturing node.

FIG. 3 illustrates a method of applying an extruded thermal insulation layer 108 to an inner portion of flexible pipe body in accordance with an embodiment of the present technology. The extruded thermal insulational layer 108 manufactured in accordance with FIG. 3 comprises an extrusion of a syntactic foam containing hollow glass micro-spheres 300.

The polymer may for example be a polypropylene with a Melt flow rate of MFR=4.5-6.0 g/10 min (at 230° C./2.16 Kg) (e.g., "Hifax" EBS 153D NAT, or "Hifax" EKS 157D NAT).

Aptly the micro-spheres have sufficient hydrostatic pressure resistance, such that at least a predetermined percentage such as 80% of the spheres survive a pressure test at 265 bar for 10 minutes undamaged. An example of such micro-spheres are the 3M glass bubbles grade 38HS &/or 38XHS. Aptly the micro-spheres are compounded into the polymer during the extrusion process (pipe coating) of the extruded insulation layer and not in a prior, separate compounding process. Each additional processing would increase the number of broken micro-spheres and thereby adversely affect the insulation properties of the extruded insulation layer. Preferably the compounding and extrusion is performed with a twin screw extruder. This is another measure to keep the number of broken micro-spheres low and thereby achieve good thermal insulation properties. A mixture of micro-spheres and polymer are moved by virtue of a screw 304 and barrel 305 arrangement into a cross head 306 where a preformed portion of flexible pipe body is introduced in the direction of arrow A shown in FIG. 3. Optionally a vent port 307 can be utilized during the extrusion process. The inner pipe is preformed so that the outer surface is the outer tensile armor layer 106 or a tape layer 104 coating the outer armor wire layer. Depending on the required flexibility of the flexible pipe it may be necessary to apply grooves to the outer surface of the extruded insulation layer. This may be achieved by a corrugator 307 which is located behind the extruder cross-head. A cooling unit 308 insulated pipe body exits the cooling unit which may then optionally have further layers formed around it followed by formation of an outer sheath 107.

Figure 4:
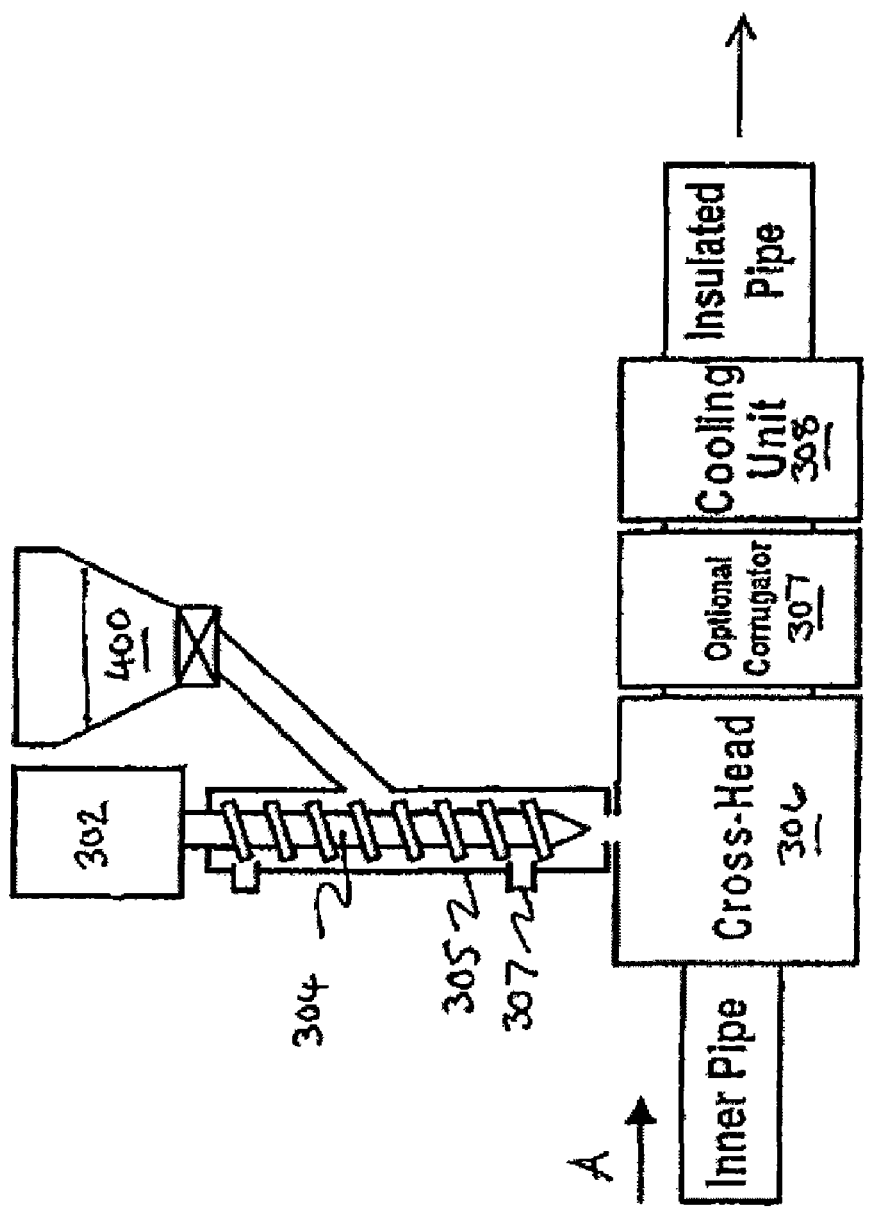
FIG. 4 illustrates a manufacturing node.

FIG. 4 illustrates another method of applying an extruded thermal insulation layer to flexible pipe body. As illustrated in FIG. 4 the thermal insulation layer 108 can be an extrusion of a syntactic foam with expandable plastic micro-spheres in a thermoplastic matrix.

The thermoplastic matrix may for example be a polypropylene (PP) with a melt flow index of 10 or higher, MFI>10 or a thermoplastic elastomer (TPE). The expandable micro-spheres contain a blowing agent. A masterbatch of these micro-spheres (e.g., Expancel 950 DU 120 or 950 DU 80) with a low melting point polymer (Tm<<180° C.) is added to the matrix thermoplastic material (e.g., PP, TPE). The mixture 400 is extruded with a single or twin screw extruder. During the extrusion process the polymer is heated to between 160° and 220°. Aptly the polymer is heated to approximately 180 to 200° C. At this temperature the blowing agent in the micro-spheres reacts and thereby expands the micro-spheres to approximately 40 times their initial diameter. It should be noted that the micro-spheres break at 250° C. and therefore the melt temperature during extrusion should not approach this temperature. Depending on the required flexibility of the flexible pipe it may be necessary to apply grooves to the outer surface of the extruded insulation layer. This may be achieved by a corrugator which is located behind the extruder cross-head.

In accordance with an alternative embodiment of the present technology another option to apply the extruded thermal insulation is to extrude a thermoplastic polymer (e.g., PP, TPE) with a chemical blowing agent. In this method the polymer granules which are fed into the extruder contain no micro-spheres. During the extrusion process the polymer is heated and the blowing agent reacts to generate a gas which expands in the polymer to form a foam. Depending on the required flexibility of the flexible pipe it may be necessary to apply grooves to the outer surface of the extruded insulation layer. This may be achieved by a corrugator which is located behind the extruder cross-head. The configuration for the manufacturing process of the extruded thermal insulation foam is the same as for the extruded syntactic thermal insulation with expandable plastic micro-spheres as shown in FIG. 4.

In accordance with a still further embodiment of the present technology an extruded thermal insulation foam of a thermoplastic polymer, (e.g., PP, TPE or the like) can also be formed by means of a physical blowing agent. In this method a supercritical fluid (e.g., CO2 or N2 or the like) is preferably fed into a foaming module (e.g., Sulzer Optifoam-Module™ or the like) located between the barrel of the extruder and the cross-head. Alternatively the supercritical fluid may also be fed into the barrel of the extruder. In the supercritical state (at high pressure) the fluid has a very high solubility in the polymer and dissolves homogeneously in the polymer melt. When the pressure in the cross-head decreases, the solubility of the fluid decreases drastically and a phase transition of the fluid to a gas leads to generation of a large number of very small voids in the polymer melt, forming a polymeric microfoam. Depending on the required flexibility of the flexible pipe it may be necessary to apply grooves to the outer surface of the extruded insulation layer. This may be achieved by a corrugator which is located behind the extruder cross-head. The configuration for the manufacturing process of the extruded thermal insulation foam with a physical blowing agent is shown in FIG. 5.

Figure 5:
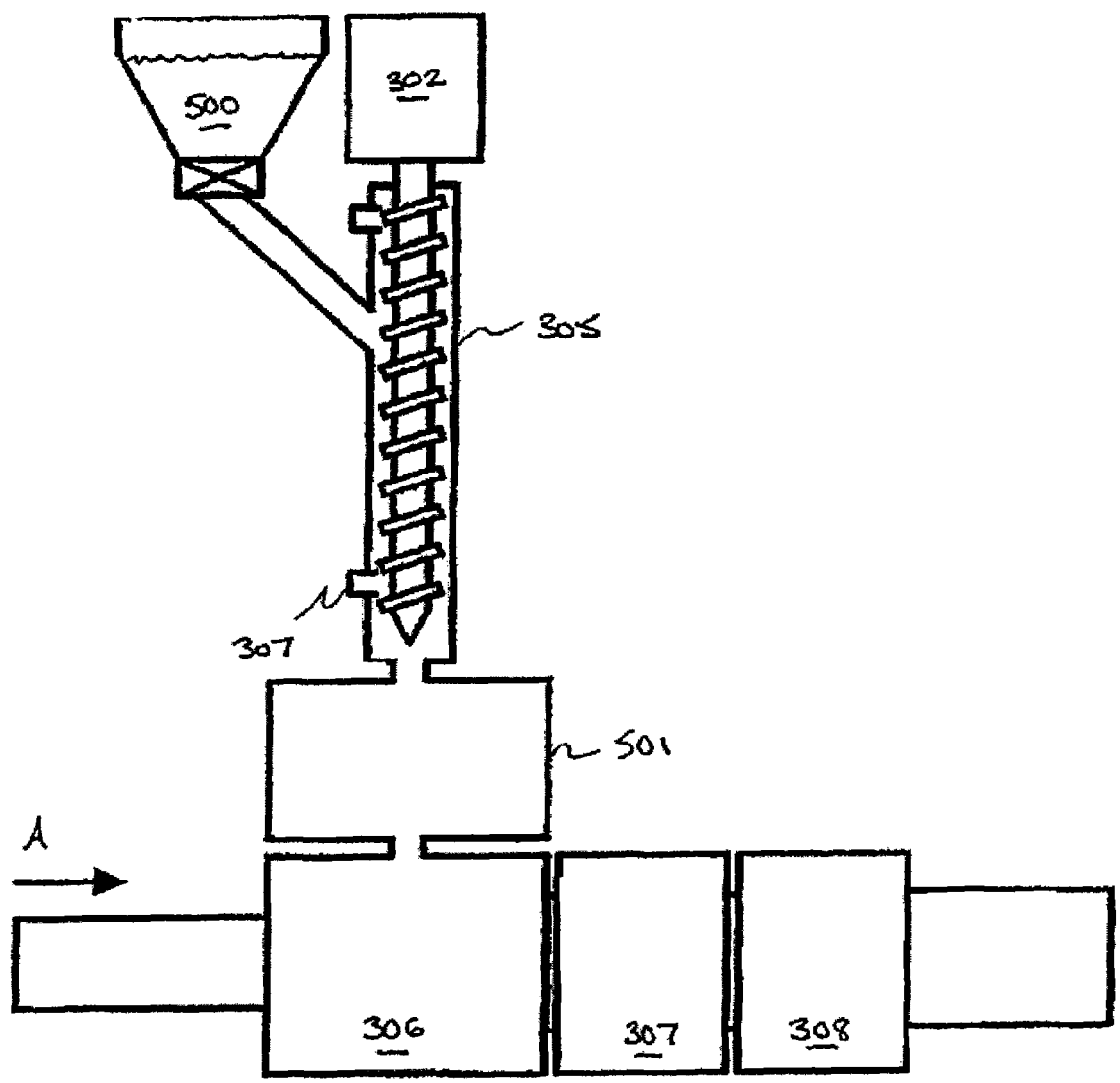
FIG. 5 illustrates a manufacturing node.

As illustrated in FIG. 5 granulate material 500 of the thermoplastic polymer is fed through the barrel 305 of an extruder driven by a motor 302. Carbon dioxide or some other such super critical fluid is fed into a foaming module 501 located between the barrel of the extruder and the cross head 306. It will be appreciated that the super critical fluid may also alternatively or additionally be fed into the barrel of the extruder such as via inlet port 307. The fluid dissolves and is mixed within the foaming module. When the pressure in the cross head 306 decreases a polymeric micro-foam is formed which is coated as a layer on the pipe introduced on the left hand side of FIG. 5. Grooves may be formed in the outer surface of the extruded insulation layer as an optional step and then the extruded layer is cooled via cooling unit 308 and emerges on the right hand side of FIG. 5. Further layers may be added as appropriate.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the technology are to be understood to be applicable to any other aspect, embodiment or example described herein unless incompatible therewith.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. Flexible pipe body for a flexible pipe, said pipe body comprising:
    a fluid retaining layer;
    at least one tensile armor layer;
    at least one extruded thermal insulation layer over an outermost one of said at least one tensile armor layer for preventing liquid water and/or water vapour flowing therethrough; and
    an outer shield layer provided directly over the insulation layer.

2. The flexible pipe body as claimed in claim 1, further comprising:
    said insulating layer is a layer of extruded syntactic foam.

3. The flexible pipe body as claimed in claim 2 wherein the extruded syntactic foam layer comprises a plurality of glass micro-spheres.

4. The flexible pipe body as claimed in claim 2 wherein the extruded syntactic foam layer comprises a plurality of plastic micro-spheres.

5. The flexible pipe body as claimed in claim 1, wherein:
    said insulating layer is an extruded polymer resin layer micro foamed with super critical fluids (SCF) or reactive foaming agents.

6. The flexible pipe body as claimed in claim 1 wherein said extruded layer comprises a plurality of circumferential grooves disposed along at least a region of the length of the insulating layer.

7. A flexible pipe body as claimed in claim 6 wherein said grooves are disposed on the inner and/or outer surface of the insulating layer.

8. The flexible pipe body as claimed in claim 1, further comprising:
    a pressure armor layer between the fluid retaining layer and the insulating layer.

9. The flexible pipe body as claimed in claim 1, further comprising:
    a carcass surrounded by the fluid retaining layer of the flexible pipe body.

10. The flexible pipe body as claimed in claim 1 wherein said fluid retaining layer comprises a barrier layer or liner.

11. A flexible pipe comprising the flexible pipe body as claimed in claim 1, further comprising:
    two end fittings each located at a respective one of two ends of the pipe body, wherein said insulating layer comprises a continuous layer extending between the end fittings.

12. The flexible pipe as claimed in claim 11, further comprising:
    at least one seal in each end fitting, each seal being disposed to form a seal between a respective end fitting and the insulating layer to thereby provide a liquid water barrier layer between a region radially within the insulating layer and a further region radially outside the insulating layer.

13. A riser flowline or jumper comprising the flexible pipe as claimed in claim 11.

14. A method of manufacturing flexible pipe body, the method
    comprising: providing a tubular fluid retaining layer;
    forming at least one tensile armor layer over the fluid retaining layer;
    extruding a thermally insulating layer over an outermost one of said at least one tensile armor layer for preventing liquid water and/or water vapour flowing therethrough; and
    forming an outer shield layer directly over the insulating layer.

15. The method as claimed in claim 14, further comprising: extruding the insulating layer directly onto the outer tensile armor layer.

16. The method as claimed in claim 15 further comprising: extruding the insulating layer by extruding a layer of syntactic foam comprising a plurality of plastic micro-spheres.

17. The method as claimed in claim 16 wherein said micro-spheres are expandable plastic micro-spheres.

18. The method as claimed in claim 15 further comprising: extruding the insulating layer by extruding a layer of syntactic foam comprising a plurality of glass micro-spheres.

19. The method as claimed in claim 15 further comprising: extruding the insulating layer by extruding a polymer resin layer comprising super critical fluids (SCF) or a reactive foaming agent.

20. The method as claimed in claim 14 further comprising: forming circumferential grooves at an inner and/or outer surface of the insulating layer subsequent to exit of the pipe from a dye during the extrusion process but prior to cooling.

21. The method as claimed in claim 14 wherein the fluid retaining layer comprises a barrier layer or liner.

22. A method of providing a flexible pipe, the method comprising:
securing a respective end fitting to each of two free ends of a portion of flexible pipe body; and
during the securing step, sealing a respective end fitting to an extruded thermally insulating layer formed in the flexible pipe body over an outermost tensile armor layer and directly under an outer shield layer thereby providing a liquid water barrier from end fitting to end fitting along the length of the flexible pipe and preventing liquid water and/or water vapour flowing therethrough.

23. A method comprising:
providing a flexible pipe body comprising a fluid retaining layer, at least one tensile armor layer, at least one extruded thermal insulation layer over an outermost one of said at least one tensile armor layer, the thermal insulation layer suitable for preventing liquid water and/or water vapour flowing therethrough, and an outer shield layer directly over the insulation layer; and
transporting fluid through the pipe body.

* * * * *